Patented June 17, 1930

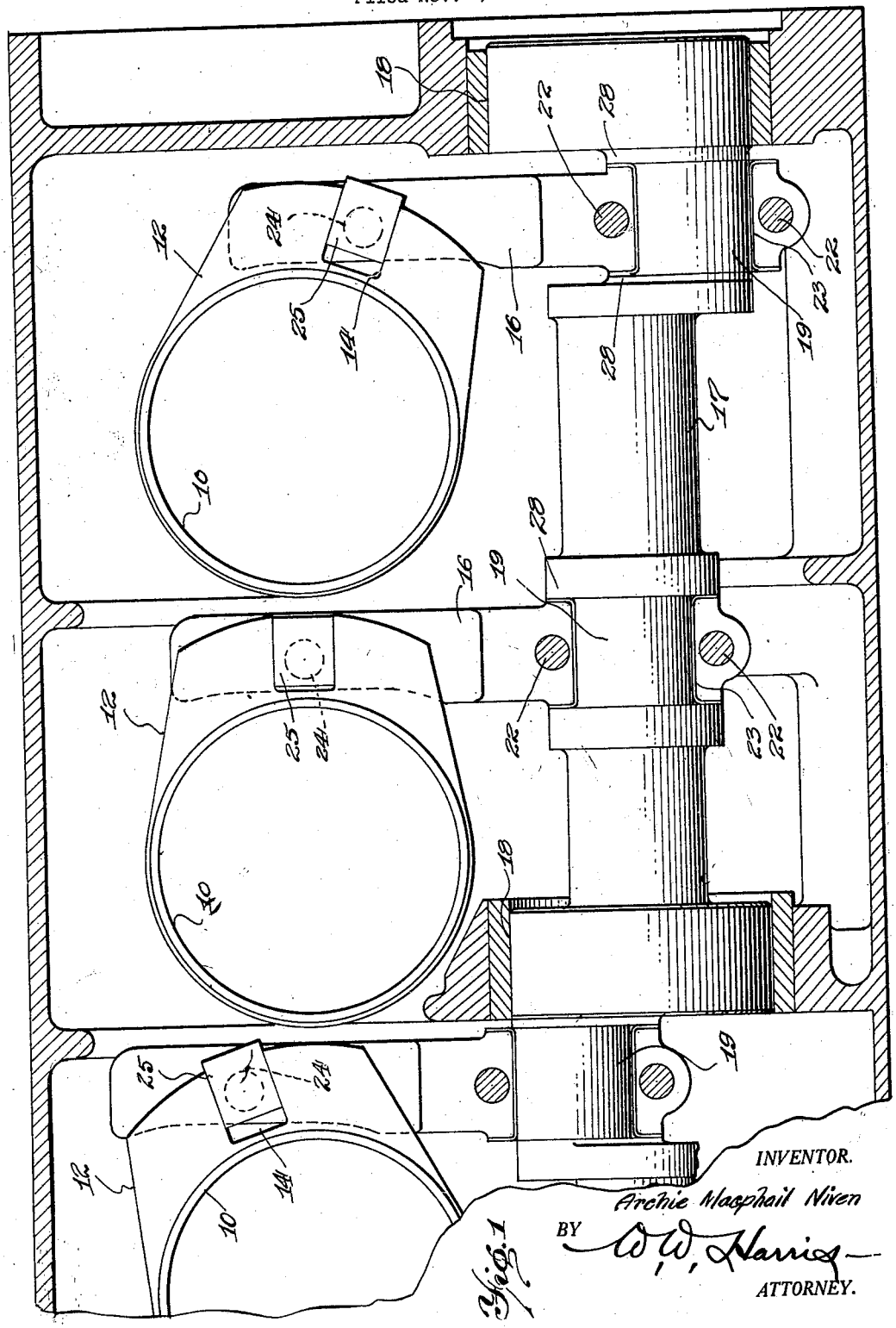

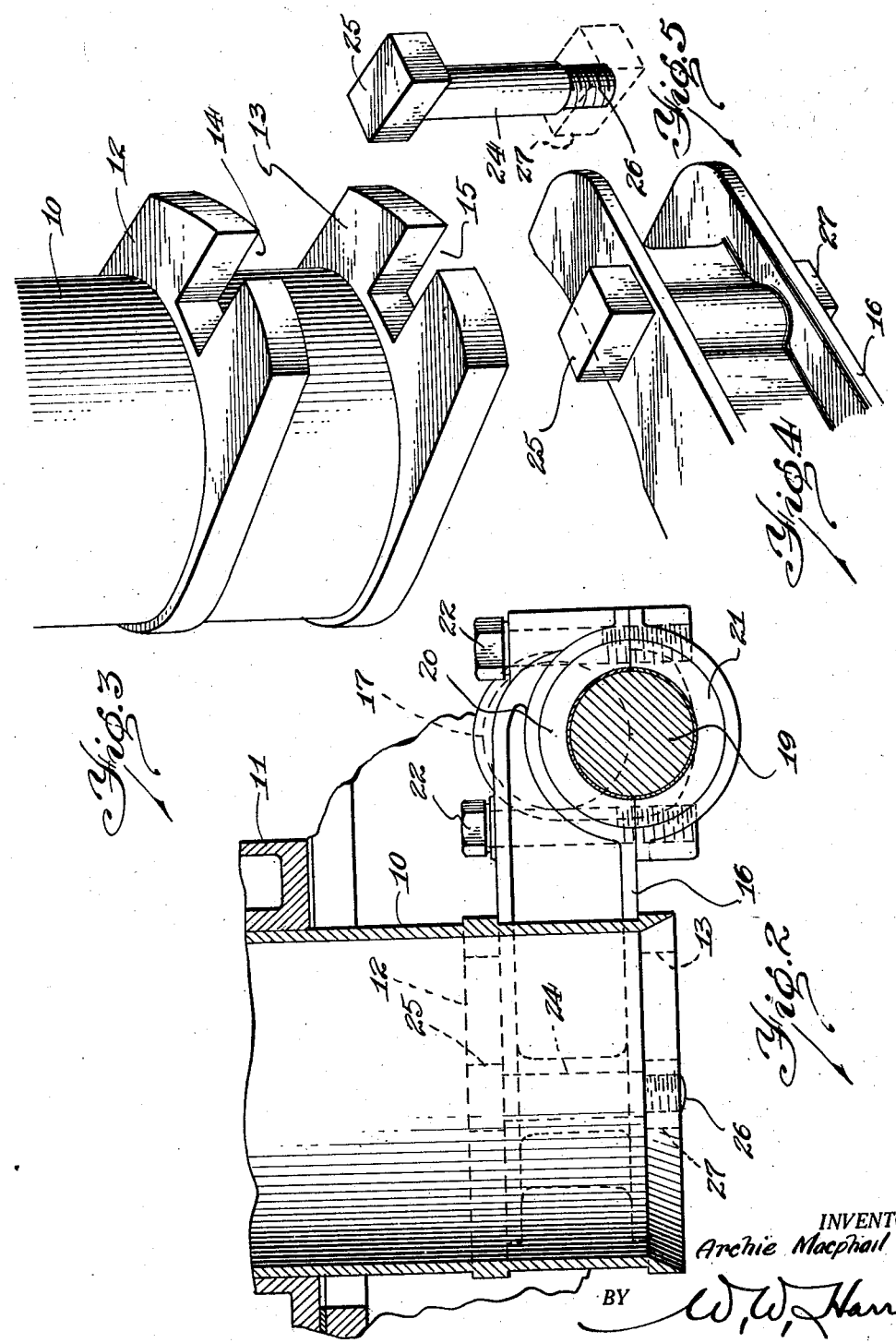

1,764,972

UNITED STATES PATENT OFFICE

ARCHIE MACPHAIL NIVEN, OF DETROIT, MICHIGAN, ASSIGNOR TO CONTINENTAL MOTORS CORPORATION, OF DETROIT, MICHIGAN, A CORPORATION OF VIRGINIA

SLEEVE-VALVE-ACTUATING MECHANISM

Application filed November 7, 1927. Serial No. 231,421.

This invention relates to internal combustion engines and refers more particularly to a sleeve valve type of engine generally known as the "Burt-McCollum." In this engine a single sleeve valve, ordinarily located between each cylinder and associated piston is given a combined oscillating and reciprocating movement whereby any point on the sleeve traces a closed curve path with respect to the cylinder in controlling the cyclic events of the engine.

My said invention relates to an improved mechanism for giving to the sleeve valve the aforesaid movement.

One object of my invention resides in simplifying the driving mechanism with resulting lower manufacturing cost, greater ease of assembly, and a more positive drive. Further advantages derived by my invention reside in a driving mechanism of less weight than usual, a factor of considerable importance. I have also provided a driving mechanism including a valveshaft operating in bearings of a diameter reduced in comparison with driving mechanisms of this general character.

Further objects and advantages of my invention reside in the novel combination and arrangement of parts as more particularly hereinafter described and claimed.

Referring to the accompanying drawings in which like reference characters indicate corresponding parts, Fig. 1 is a plan sectional view of a portion of a multi-cylinder engine showing my improved driving mechanism, Fig. 2 is a sectional elevation view through the valveshaft and a typical sleeve valve, Fig. 3 is a perspective view of a sleeve valve, Fig. 4 is a perspective view of the sleeve valve engaging end of the sleeve driving link, and Fig. 5 is a perspective view of the coupling device for the link and sleeve.

In the drawings reference character 10 indicates the single sleeve valves having the usual or other preferred ports (not shown) for cooperation with the ports (not shown) of the respective cylinders. My invention relates particularly to the sleeve driving mechanism, the particular form of ports being well known and not important for an understanding of this invention.

As shown in Fig. 2 each sleeve 10 may move within the associated cylinder 11, and is provided with link engaging means consisting of a pair of spaced lugs 12, 13 extending transversely to the sleeve axis. The lugs are formed with slots 14, 15 respectively, extending radially of the sleeve axis and in alignment with each other. Positioned between lugs 12, 13 and bearing on the opposed faces of these lugs is a link 16, this link being formed with machined lug-engaging bearing faces. The link is of the type adapted to be driven at one end thereof from a valveshaft 17, rotated in spaced bearings 18 at the usual speed of one half the engine crankshaft for a four stroke cycle engine or at full crankshaft angular velocity for a two stroke cycle engine. The valveshaft is provided with spaced cranks 19 preferably of a cylindrical character and engageable by the link bearing 20 with its associated bearing cap 21 secured by bolts 22. Babbit may be provided at 23 for the bearing between the link 16 and crank 19.

The link 16 has an opening receiving pivot pin 24 preferably formed with a head 25 closely fitting for sliding within the slot 14. The pin 24 has a reduced end 26 threaded to receive a second head 27 likewise having a close sliding fit in the slot 15. In assembly it will be noted that the pin 24 may be placed in the opening in link 16 and the head 27 secured on the threaded end 26. The link may then be assembled on its respective crank 19 with the heads 25, 27 engaged in the slots 14, 15 respectively. No locking means is necessary for the heads 25, 27 since neither can turn in the slots after assembly and the link cannot leave its position between the lugs 12, 13 because of the crank flanges 28 engaging the sides of the link bearing.

The cranks 19 are relatively angularly positioned to provide the relative desired functioning of the various cylinders as will be readily understood. As the valveshaft rotates each link 16 will be moved in a plane parallel to itself, the longitudinal axis of the link moving in a plane perpendicular to the valveshaft axis of rotation. The pivot pin 24 is rotatable in the link opening so that as the sleeve is oscillated by the heads 25, 27, these heads slide radially in the respective slots 14, 15 thus compensating for the angular movement of the sleeve. Thus the heads 25, 27 oscillate with the sleeve valve but these heads have no relative rotation which might cause their relative disconnection with the pin 24.

The engaged faces of the link and lugs 12, 13 impart to the sleeve the reciprocating component of its combined movement.

By reason of the sliding oscillating means connecting the link and sleeve I have provided a link which does not require a sliding or ball and socket coupling with the valveshaft, one advantage over the latter resulting ordinarily in smaller bearings 18. The simply constructed cranks 17 do not project as far from the valveshaft axis as compared with a ball and socket of typical construction and since it is desirable to insert the valveshaft axially in its bearings it follows that these bearings must enclose the longitudinal projection of the valveshaft.

My improved sleeve driving mechanism is of a simple character, readily assembled and is self locking in that the pivot pin parts need no lock washers and the like. One important feature of my invention resides in the sliding and oscillating link and sleeve connection in combination with a link and sleeve of the character described. Furthermore it will be noted that the heads 25, 27 preferably lie within the height of the respective lugs 12, 13. With the head 25 so located as provided by my invention I am able to bring the cylinder 11 lower than usual, there being no projections above the lug 12 which would require corresponding clearance. Thus, greater support for the sleeve valve is afforded, the lower portion of which, at the lower portion of the movement, projects downwardly from the cylinder. At the same time a more compact arrangement is obtained. With the lower head 27 similarly located substantially within the height of lug 13 the crankcase webbing (not shown) may be brought closer to the sleeve and still clear the sleeve throughout movement thereof.

By maintaining the point of contact between the sleeve and link along the plane of the movement a more desirable valve porting is obtained than where this point deviates from this path, as in following the arc of movement of the sleeve valve. The same port height will be obtained for a given crank throw but the port width will be slightly narrowed, to advantage.

What I claim as my invention is:

1. Sleeve valve driving mechanism for engines comprising in combination a sleeve valve having spaced lugs projecting outwardly therefrom, a rotary valve shaft provided with a crank, a link connected at one end with the crank and having its other end positioned between the sleeve lugs, said lugs each provided with a slot opening outwardly thereof, a pin extending transversely through the link, heads for the pin slidably engaging the slots respectively, said link moving in a plane perpendicular with the axis of rotation of the valveshaft, said heads having an oscillating movement with respect to the link and a sliding movement in the respective slots, for imparting to the sleeve valve a combined oscillating and reciprocating movement.

2. Sleeve valve driving mechanism for engines comprising in combination a sleeve valve having spaced lugs projecting outwardly therefrom, a rotary valve shaft provided with a crank, a link connected at one end with the crank and having its other end positioned between the sleeve lugs, said lugs each provided with a slot opening outwardly thereof, a pin extending transversely through the link, heads for the pin slidably engaging the slots respectively, said link moving in a plane perpendicular with the axis of rotation of the valveshaft, said heads having an oscillating movement with respect to the link and a sliding movement in the respective slots, for imparting to the sleeve valve a combined oscillating and reciprocating movement, one of said heads lying substantially within the height of its associated sleeve lug.

3. Sleeve valve driving mechanism for engines comprising in combination a sleeve valve having spaced lugs projecting outwardly therefrom, a rotary valve shaft provided with a crank, a link connected at one end with the crank and having its other end positioned between the sleeve lugs, said lugs each provided with a slot opening outwardly thereof, a pin extending transversely through the link, heads for the pin slidably engaging the slots respectively, said link moving in a plane perpendicular with the axis of rotation of the valve shaft, said heads having an oscillating movement with respect to the link and a sliding movement in the respective slots, for imparting to the sleeve valve a combined oscillating and reciprocating movement, said heads lying substantially within the height of their respective associated sleeve lug.

4. Mechanism of the character described comprising in combination with a sleeve valve, means for imparting to the sleeve a combined reciprocating and oscillating movement comprising, a valveshaft having a crank, a link connected at one end to the crank, and means connecting the sleeve with the other end of said link including an element having an oscillating movement with respect to the link and a sliding movement with respect to the sleeve, for imparting to the sleeve the aforesaid movement.

5. Mechanism of the character described comprising in combination with a sleeve valve, means for imparting to the sleeve a combined reciprocating and oscillating movement comprising, a valveshaft having a crank, a link connected at one end to the crank, said sleeve having a lug projecting therefrom formed with an opening in the lug, an element having a flat bearing surface slidable in the lug opening, and means connecting said element with the other end of the link, for imparting to the sleeve the aforesaid movement.

6. Mechanism of the character described comprising in combination with a sleeve valve, means for imparting to the sleeve a combined reciprocating and oscillating movement comprising, a valveshaft having a crank, a link connected at one end to the crank, said sleeve having a perforated projection, an element having a flat bearing surface slidable in said perforation radially of the sleeve, and connecting said element with the other end of the link, for imparting to the sleeve the aforesaid movement.

7. Mechanism of the character described comprising in combination with a sleeve valve, means for imparting to the sleeve a combined reciprocating and oscillating movement comprising, a valveshaft having a crank, a link connected at one end to the crank, said sleeve having spaced radially slotted lugs projecting therefrom, and a pair of bearing members having parallel bearing faces working in said slots respectively and connecting the sleeve and the other end of the link for imparting to the sleeve the aforesaid movement.

8. Mechanism of the character described comprising in combination with a sleeve valve, means for imparting to the sleeve a combined reciprocating and oscillating movement comprising, a valveshaft having a crank, a link connected at one end to the crank, said sleeve having spaced radially slotted lugs projecting therefrom, an element having parallel side bearing faces slidable in each of said slots connected to the other end of said link, for imparting the aforesaid movement to the sleeve.

9. Mechanism of the character described comprising in combination with a sleeve valve, means for imparting to the sleeve a combined reciprocating and oscillating movement comprising, a valveshaft having a crank, a link connected at one end to the crank, said sleeve having a lug projecting therefrom formed with an opening in the lug, an element slidable in the lug opening and restrained from rotation therein, and means connecting said element with the other end of the link, for imparting to the sleeve the aforesaid movement, said element lying substantially within the thickness of the sleeve lug.

10. Mechanism of the character described comprising in combination with a sleeve valve, means for imparting to the sleeve a combined reciprocating and oscillating movement comprising, a valveshaft having a crank, a link connected at one end to the crank, said sleeve having spaced radially slotted lugs projecting therefrom, the other end of said link positioned between the sleeve lugs, a pin connecting the link and sleeve lugs the said pin having heads slidable in the lug slots respectively, for imparting to the sleeve the aforesaid movement.

11. Mechanism of the character described comprising in combination with a sleeve valve, means for imparting to the sleeve a combined reciprocating and oscillating movement comprising, a valveshaft having a crank, a link connected at one end to the crank, said sleeve having vertically spaced slotted lugs projecting therefrom, the other end of the link having a sliding bearing with the opposed faces of the sleeve lugs, an element slidable radially of the sleeve in each lug slot, and means connecting the elements and link, for the imparting to the sleeve the aforesaid movement said connecting means and said element in the upper sleeve lug lying substantially below the upper limit of said upper sleeve lug.

12. Mechanism of the character described comprising in combination with a sleeve valve, means for imparting to the sleeve a combined reciprocating and oscillating movement comprising, a valveshaft having a crank, a link connected at one end of the crank, and means connecting the sleeve with the link including an element constrained to have an oscillating movement with respect to the link and a sliding movement with respect to the sleeve, for imparting to the sleeve the aforesaid movement.

13. Mechanism of the character described comprising in combination with a sleeve valve, means for imparting to the sleeve a combined reciprocating and oscillating movement comprising, a valveshaft having a crank, a link connected at one end to the crank, said sleeve having a lug projecting therefrom formed with an opening in the lug, an element having an enlarged head slidable in the lug opening, and means connecting said element with the link, for imparting to the sleeve the aforesaid movement.

14. Mechanism of the character described comprising in combination with a sleeve valve, means for imparting to the sleeve a combined reciprocating and oscillating movement comprising, a valveshaft having a crank, a link connected at one end to the crank, said sleeve having spaced slotted lugs projecting therefrom, the link having a sliding bearing with the opposed faces of the sleeve lugs, an element slidable in each lug slot, and means connecting the elements and link, for imparting to the sleeve the aforesaid movement, said elements and connecting means lying substantially within the axial limits of said lugs.

15. Mechanism for imparting a combined reciprocating and oscillating movement to a sleeve valve comprising in combination, a sleeve valve member, a crank valveshaft, a link member operatively connected to the crank and sleeve, said link and sleeve connection including an element constrained to have an oscillating movement with respect to one of said members and a sliding movement with respect to the other of said members.

In witness whereof, I hereunto subscribe my name this 5th day of November, A. D. 1927.

ARCHIE MACPHAIL NIVEN.